(12) United States Patent
Klingman

(10) Patent No.: US 7,043,568 B1
(45) Date of Patent: May 9, 2006

(54) CONFIGURATION SELECTION FOR USB DEVICE CONTROLLER

(76) Inventor: Edwin E. Klingman, 3000 Highway 84, San Gregorio, CA (US) 94074

( * ) Notice: Subject to any disclaimer, the term of this patent is extended or adjusted under 35 U.S.C. 154(b) by 1108 days.

(21) Appl. No.: 09/670,509

(22) Filed: Sep. 26, 2000

Related U.S. Application Data

(63) Continuation-in-part of application No. 09/191,443, filed on Nov. 12, 1998, now Pat. No. 6,219,736.

(51) Int. Cl.
G06F 3/00 (2006.01)
G06F 13/00 (2006.01)
G06F 13/14 (2006.01)
G06F 12/10 (2006.01)
H04L 12/28 (2006.01)

(52) U.S. Cl. .................. 710/8; 710/9; 710/10; 710/14; 710/107; 710/110; 710/306; 710/310; 710/313

(58) Field of Classification Search ................ 710/107, 710/110, 306, 310, 313, 8–10, 14
See application file for complete search history.

(56) References Cited

U.S. PATENT DOCUMENTS

| | | | |
|---|---|---|---|
| 4,604,683 A | 8/1986 | Russ et al. ................... 710/100 |
| 4,799,156 A | 1/1989 | Shavit et al. .................. 705/26 |
| 5,497,373 A | 3/1996 | Hulen et al. ................. 370/259 |
| 5,530,894 A | 6/1996 | Farrell et al. ................ 709/250 |
| 5,537,654 A | 7/1996 | Bedingfield et al. .......... 710/14 |
| 5,541,930 A | 7/1996 | Klingman .................... 370/524 |
| 5,574,861 A | 11/1996 | Lorvig et al. ................ 709/226 |
| 5,682,552 A | 10/1997 | Kuboki et al. ................. 710/52 |
| 5,860,021 A | 1/1999 | Klingman .................... 712/32 |
| 5,987,617 A | 11/1999 | Hu et al. ..................... 713/320 |
| 6,185,641 B1 | 2/2001 | Dunnihoo .................... 710/56 |
| 6,219,736 B1 | 4/2001 | Klingman ................... 710/315 |
| 6,219,774 B1* | 4/2001 | Hammond et al. .......... 711/202 |
| 6,230,226 B1 | 5/2001 | Hu et al. ..................... 710/305 |
| 6,389,495 B1* | 5/2002 | Larky et al. .................... 710/8 |
| 6,523,081 B1 | 2/2003 | Karlsson et al. ............. 710/305 |
| 6,760,333 B1* | 7/2004 | Moody et al. ............. 370/395.1 |

OTHER PUBLICATIONS

Garney, John, et al., *USB Hardware and Software*, 1998; ISBN 0-929392-37-X.
Don Anderson, "Universal Serial Bus System Architecture", ISBN 0-201-46137-4.

* cited by examiner

*Primary Examiner*—Tammara Peyton
(74) *Attorney, Agent, or Firm*—Anthony B. Diepenbrock, III; Dechert LLP

(57) ABSTRACT

A selection system for configuring a device controller. The selection system includes a plurality of state machines each of which has a portion of the configuration information needed to inform a host, connected to the device controller via a serial bus, of the device configuration as well as the configuration, interface and endpoint information. The selection system also includes a selection circuit that selects one of the plurality of state machines in response to a selection code that can be set by a user manually or automatically by programming are register. The manual setting of the selection code is by means of a set of configurable pins which are selected as the default source of the selection code by the selection system.

If there are available a variety of device configurations and associated interface and endpoint configurations, the selection system selects one of the device configurations and the associated other configuration information in response to the same selection code, thereby maintaining consistency between the device configuration information and the other associated configuration information.

4 Claims, 14 Drawing Sheets

FIG. 3

| Byte Count | Packet count | Valid | Type | Page# | Index |
|---|---|---|---|---|---|
| 42 | 44 | 46 | 48 | 50 | 52 |

40

```
module ADA (clk,reset,dpdi,dpdout,usb_endpt,dp_1_read,
            dp_1_write,set_token,valid_token,stall,Vo,Vi)
output [7:0] dpdi;
output stall;
input [7:0] dpdout;
input [3:0] usb_endpt;
input set_token, valid_token, dp_1_read, dp_1_write;

SETUP_FSM setup_FSM (.dpdout(dpdout),.clk (clk),.reset(reset),
.data (data),.mux (mux).dp_1_write(dp_1_write), .set_token
(set_token),.valid_token (valid_token));

INTERPRET_FSM interpret_FSM(.clk (clk),.reset (reset), .data (data), .stall
(stall), .mux (mux),.sel (sel), .address (address), .config
(config), .descrip (descrip), .DIR (DIR), .STD (STD), .etc. );

DESCRIP_FSM descrip_FSM (.d_data (d_data),.dp_1_read (dp_1_read), .descrip
(descrip),.reset (reset),.clk (clk));

CONFIG_FSM config_FSM(.c_data (c_data),.dp_1_read (dp_1_read),
.config (config),.reset (reset),.clk (clk));

ADDRESS_FSM address_FSM (.a_data (a_data),.dp_1_read (dp_1_read),
.address (address),.reset (reset),.clk (clk));

always @ (posedge clk) begin: Out_Mux:
case (sel)
     0 : s_data = d_data; // select descriptor data.
     1 : s_data = c_data; // select config data.
     2 : s_data = a_data; // select address data
     3 : s_data = other; // select other appropriate data.
endcase
end
wire [ 7:0 ] dpdi = (usb_endpt == 0) ? AD_out : s_data;
endmodule
```

FIG. 6A

```
module SETUP_FSM (dpdout, clk, reset, data, mux,
dp_1_write, set_token, valid_token);

input [7:0] dpdout;
input [3:0] usb_endpt;
input clk, reset, valid_token, set_token, dp_1_write;

output [7:0] data;
output interpret; reg interpret;

reg[7:0] REQUEST, REQ, VALUE1, VALUE2, INDEX1,
        INDEX2, LENGTH1, LENGTH2;
reg[3:0] state, next_state;

always @ (negedge clk)
   if (set_token & valid_token)  state = get_SETUP;
   else state = next_state;
always @ (posedge dp_1_write or posedge reset)
begin: SETUP_FSM
  if (reset) begin
      next_state = get_SETUP;
      interrupt <= 0;
      end
  else if (valid control endpoint and set_token)
  begin case (state)
  get_SETUP : begin
              interrupt <= 0;
              REQ[7]   = dpdout[7];
              REQ[6:5] = {dpdout[6], dpdout[5]};
              next_state = get_REQ;
              end
  get_REQ : begin
              REQUEST = dpdout;   // [7:0]
              next_state = get_VALUE1
              end
  get_VALUE1: begin
              VALUE1 = dpdout;
              next_state = get_VALUE2;
              end
  get_VALUE2: begin
              VALUE2 = dpdout;
              next_state = get_INDEX1;
              end
  get_INDEX1:
  get_INDEX2:
  get_LENGTH1: begin
              LENGTH1 = dpdout;
              next_state = get_LENGTH2;
                      end
  get_LENGTH2: begin
              LENGTH2 = dpdout;
              next_state = get_LENGTH2;
              interpret <= 1; // enable interpret_FSM
              end
  endcase endmodule
```

FIG. 6B

```verilog
module INTERPRET_FSM (clk, reset, data,
stall, mux, sel, address, config,
descrip, DIR, STD, etc.);
input [7:0] data;
input interpret;
output [2:0] mux, sel;
output address, config, descrip; // or
other interpreted requests
output DIR, STD, etc;  // CLASS, VENDOR,
etc.

reg address, config, descrip;
reg  [2:0]state, next_state;

always @ (state or interpret or data)
begin : INTERPRET
if  (interpret) begin case (state)

INIT: begin
      stall = 0;
      mux = REQ_type:
      next_state = got_REQ_type;
      end got_REQ_type: begin DIR <= data[7];

case ({ data[6], data[5] })

00 : STD = 1;
      01 : CLAS = 1;
      10 : VEND = 1;
      11 : ERR = 1;

endcase
      next_state = get_REQ;
end get_REQ:   begin
           mux = sel_REQ;
           next_state = got_REQ;
           end
got_REQ:   begin case (data)

00: begin
          sel = `STATUS;
          status = 1;
          next_state = get_status;
        end 05: begin
          sel = `ADDRESS;
          address = 1;
          next_state = get_address
          end 06: begin
          sel = `DESCRIP;
          descrip = 1;
          next_state = get_desc
          end 08:  begin
          sel = `CONFIG;
          do_config = 1;
          next_state = get_config;
          end 0A: begin
          sel = `INTERFACE;
          interface = 1;
          next_state = get_interface;
          end default:   stall = 1;

endcase //data
end get_address : begin
mux = VALUE2;
if (interpret) next_state = get_address;
else  next_state = INIT:
end endcase //state end always @ (posedge clk) begin
  if(reset) state = INIT;
  else state = next_state;
          end endmodule
```

FIG. 6C

```
Module  DESCRIP_FSM (desc, descrip, dp_1_read)

output [7:0] desc;
input              descrip, dp_1_read, always @ (posedge dp_1_read) begin: descrip_FSM if (descrip) begin case (state)

0: begin
        desc = length; //18
        state = 1;
       end

1: begin
        desc = type; // = 1
        state = 2;
       end

2: begin
        desc = USB. version; //1
        state = 3;
       end

3: begin
        desc = next_byte, etc.
        state = 4;
       end states 4 thru 16 not shown 17: begin
          desc = last byte
          state = last_state;
         end last state: begin . . .

endcase end endmodule
```

FIG. 6D

CONFIGURATION SELECTION FOR USB DEVICE CONTROLLER

CROSS-REFERENCE TO RELATED APPLICATIONS

This application is a continuation-in-part of U.S. patent application Ser. No. 09/191,443, filed on Nov. 12, 1998, entitled A UNIVERSAL SERIAL BUS (USB) RAM ARCHITECTURE FOR USE WITH MICROCOMPUTERS VIA AN INTERFACE OPTIMIZED FOR INTEGRATED SERVICES DEVICE NETWORK (ISDN) and is now issued as U.S. Pat. No. 6,219,736 B1 on Apr. 17, 2001 and is incorporated herein by reference.

This application is related to U.S. patent application Ser. No. 09/670,954, filed Sep. 26, 2000, entitled USB DEVICE CONTROLLER.

FIELD OF THE INVENTION

This invention relates generally to a device controller for a standardized bus and more particularly a selection system for selection one of a number of configurations for the interface controller.

DESCRIPTION OF THE RELATED ART

The proliferation of the personal computer has spawned a large market for peripheral devices for these personal computers. To attach these peripheral devices an interface bus, the ISA bus was developed. This bus required that a printed circuit board be attached to the bus which was accessible only by opening the personal computer system's housing. Although this means of attaching peripheral devices worked well, there were driver and resource sharing problems that led to the development of a higher-speed, internal bus, the PCI bus, and a lower speed external bus, the Universal Serial Bus (USB), which is designed to multiplex low-speed device transfers over a single pair of wires operating bidirectionally and requires only minimal resources from the system that hosts the USB.

The USB is a serial cable bus that supports packet-based transactions between a USB Host and one or more USB Devices. At the highest level, USB Devices implement one or more application-specific functions by means of USB interfaces, one for each function. A USB interface includes one or more endpoints, where an endpoint is an addressable part of a device that acts as the sender or receiver of a transaction. The USB Host communicates with the endpoints of the USB device through pipes and each endpoint and pipe support certain control and data transfer types Thus, a USB Host sees a USB Device as a collection of interfaces and pipes. However, the interfaces of a USB device must be configured and made known to the USB host and configuring a USB device requires a that the USB device handle a complex high-level protocol on top of the packet-based transactions.

The USB system has brought forth several new types of interface devices for adapting a peripheral to the high-level protocols of the USB. Some of these types are a USB-to-clocked-serial interface, USB-to-FIFO and embedded USB in a microcontroller. In addition, special purpose interface devices are available which include USB-to-Ethernet, USB-to-Floppy Disc Controller, USB-to-IEEE parallel port, USB-to-Scan controller, USB-to-Keyboard, USB-to Audio Codec, and USB-to-ATAPI devices. These devices typically include an 8-bit microcontroller that is programmed to handle the USB high-level protocols on the one hand and to manage the application specific interface on the other hand. These special purpose devices are usually produced in high volume and require a large design effort.

To answer a lower-volume need, while still retaining a flexible interface, a different type of USB device controller was developed by the applicant. This device, a USB-RAM, is described in U.S. patent application Ser. No. 09/191,443, filed on Nov. 12, 1998, entitled A UNIVERSAL SERIAL BUS (USB) RAM ARCHITECTURE FOR USE WITH MICROCOMPUTERS VIA AN INTERFACE OPTIMIZED FOR INTEGRATED SERVICES DEVICE NETWORK (ISDN) and is now issued as U.S. Pat. No. 6,219,736 B1 on Apr. 17, 2001 (54208–00028), which is hereby incorporated by reference into the present application. USB-RAM device controller provides a general solution for connecting to the USB by providing an interface to the USB electrical bus and supporting the fixed protocol that is associated with all USB applications. The application specific aspects are handled by writing packets into a common memory and reading packets from the memory under interrupt control.

FIG. 1 shows a block diagram of the USB-RAM device controller 8, which has two interfaces, one of which 10 connects to the USB D+ and D– lines and the other, a client processor interface 12, which has address, data and control lines for connecting to a local microcontroller 14. The USB-RAM device controller 8 includes a serial interface engine, SIE 16, for sending and receiving packets on the USB in accordance with the USB protocols and an interfacing device 18 which comprises an endpoint register file 20, a common memory storage area 22 and control logic (not shown). The common memory storage area 22 includes data buffers 24 for holding operating data and data buffers 26 for transferring data between the function engine 14 and the USB interface 10.

FIG. 2. shows a more expanded block diagram of the device controller 8 and in particular the common memory 22. According to the figure, the common memory storage area 22 includes data buffers 30 used by the endpoints 20, an interrupt register image 32 and command register image 34, and an image area for the endpoint registers 36, 38 to allow the microcontroller to have access to the endpoint register file 20.

FIG. 3 shows a representative endpoint register from the endpoint register file 20. The endpoint register 40 has a byte count field 42, a packet count field 44 for tracking how many packets are to be sent or received, a valid field 46 which determines whether the endpoint is valid, a type field 48 for holding the type of endpoint described by the register, a page number field 50 and index field 52 for accessing the common memory storage 22 of FIG. 1.

Transfers to the USB host 28 in FIG. 1 occur when the local microcontroller 14 connected to the client processor interface 12 writes a data packet into the common memory 22, sets up a packet pointer 50, 52 and a length counter 42 in the relevant endpoint register 40, checks to determine that the command register image 34 is cleared and then writes a send command into the command register image 34. The local processor 14 receives an interrupt that the data packet was sent on the USB to the host processor 28.

Transfers from the USB host 28 in FIG. 1 occur by the host processor 28 sending a data packet on the USB bus to the device controller 18, which causes the data packet to be stored in the common memory 22 at a location specified by the relevant endpoint register 40 in FIG. 3. The local processor 14 connected to the client interface 12 of the device controller 18, receives an interrupt with an endpoint specific code that gives it notice that a packet has been received in the common memory 22. The local processor 14 then reads the interrupt code which identifies the endpoint, then reads the endpoint register image 38 to find the pointer 50, 52 to the packet and its length 44 and then reads the packet. A flag is set in the device controller to indicate to the USB interface that the local processor 14 has read the data packet and is ready for another. Prior to setting the flag, auto-NAKS are generated to the USB host.

However, the special purpose devices described above and the USB-RAM device controller as well suffer from a new problem because of a change to the USB specification. The speed of the USB, according to version 2.0, has increased greatly, from 12 MHz to 480 MHz. With this speed increase, it is very difficult for a local microcontroller or processor to keep up with the demands of the bus and handle the high-level protocol without slowing the bus down to an unacceptable speed. A protocol mechanism for slowing the bus down does exist (the auto-NAK mechanism) but using it is undesirable for a USB 2.0 type bus.

Therefore, there is a need for a new USB device controller, one that provides a generalized and configurable solution to connecting to the USB and operates at speeds that will not slow down the USB running at 480 MHz. Furthermore, there is a need that such a device be available for low and medium volume applications, not involve a large design effort to bring to market and for the device to be flexible enough to support a number of useful configurations so that only one device is needed for the most common configuration cases.

BRIEF SUMMARY OF THE INVENTION

The present invention is directed to the foregoing needs. A system, in accordance with the present invention, for configuring an interfacing device with multiple configurations includes a plurality of state machines, each for delivering configuration information, including device, configuration, interface and endpoint information. Each state machine has a data output and an enable input that activates a state machine to produce its configuration information. The system also includes a selection circuit having a plurality of data inputs, one connected to the data output of each of the state machines, a plurality of selection code inputs that receive selection code signals, and a data output that carries the selected output. The selection circuit is configured to connect one of selection circuit data inputs to the data output of the selection circuit in response to signals on the selection code inputs.

An advantage is that the configuration of the interfacing device for the USB device is selectable among a set of fixed configurations so that the interfacing device can serve a number of different applications.

Another advantage is that the configuration of the interfacing device can be set manually by the user or electronically by programming a register with a selection code.

Yet another advantage is that configuration information is consistent, a particular device configuration being associated with one or more configurations that include interface and endpoint configurations, such that when the device configuration is selected the associated other configuration are selected.

BRIEF DESCRIPTION OF THE DRAWINGS

These and other features, aspects and advantages of the present invention will become better understood with regard to the following description, appended claims, and accompanying drawings where:

FIG. 3 shows an endpoint register of FIG. 2;

FIGS. 6A, 6B, 6C and 6D set forth a description in a high-level hardware modeling language of the state machine system of FIG. 5;

DETAILED DESCRIPTION OF THE INVENTION

Figure 1:
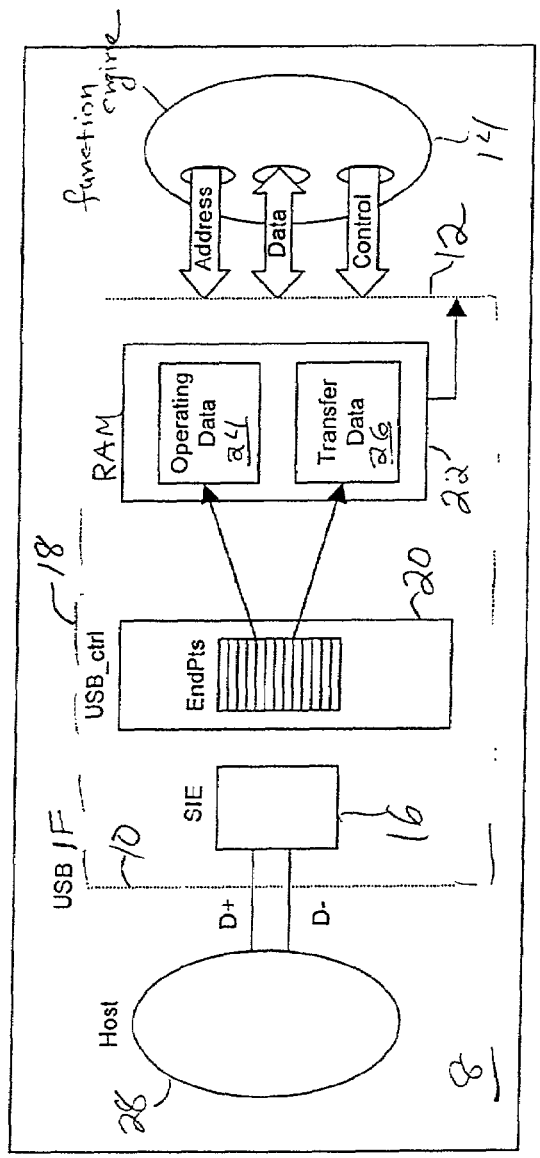
FIG. 1 shows the architecture of the USB-RAM device controller.
Figure 2:
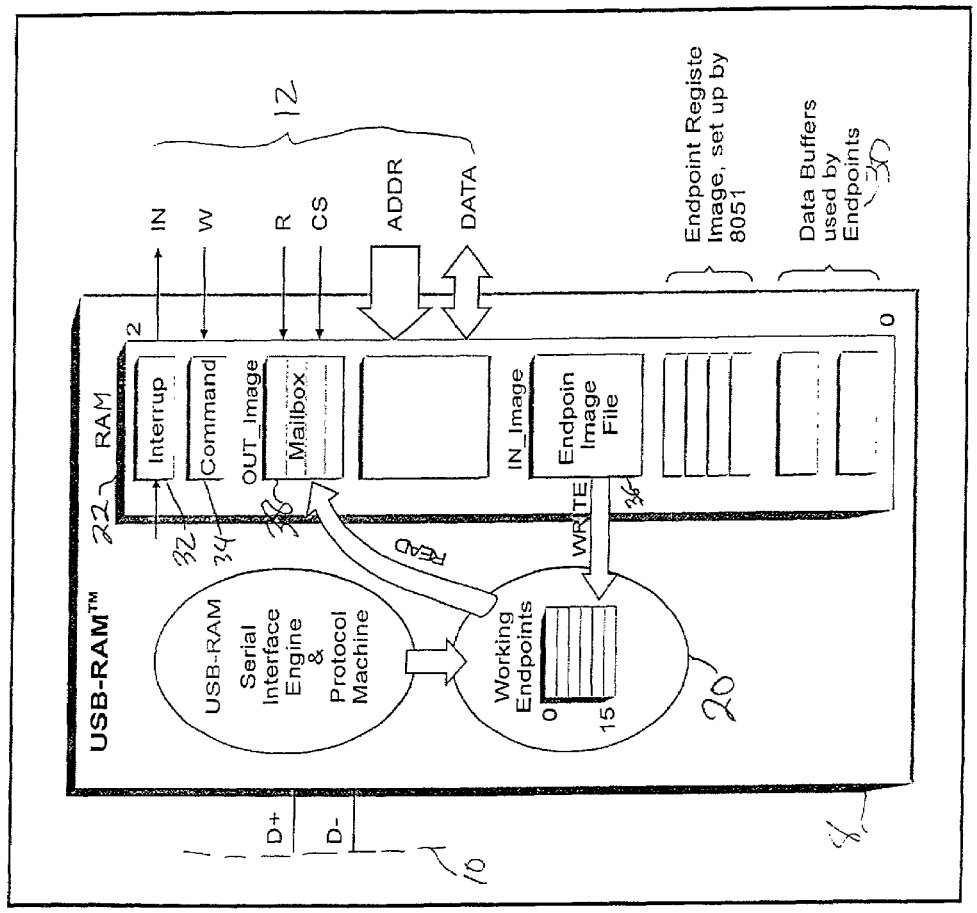
FIG. 2 shows a more detailed block diagram of the USB-RAM device controller.

To understand the functions of the present invention, a portion of the USB packet, transaction and setup protocol is described below.

The packet-based transactions on the USB through the pipes described above between the USB Host and USB Device consist of one or more packets transferred over the USB. All packets that can be transferred over the USB fall into three categories, (i) token, (ii) data or (iii) handshake packets.

A token packet identifies the direction of a bus transaction, the address of the USB device, and the endpoint in the USB device involved with the host in the transaction. A data packet carries device specific data between the USB-Host and a device's endpoint. Lastly, a handshake packet is used to return flow control information for a bus transaction.

The four types of information transfers, bulk, interrupt, isochronous and control, each employ the above packets types to carry out the transfer. For example, in a bulk transfer, the host sends a token packet, IN or OUT (where the direction is relative to the host), the data is then transferred in a data packet between the device and the host and finally a handshake packet, such as ACK, is delivered by the device or the host depending on the direction of the transfer, or a NAK or STALL is delivered by the device. The handshake packet ACK means that the data was transferred successfully. The NAK means that the device is not ready to transfer data and the STALL means that host intervention of the device is required, probably due to an error condition.

An important type of information transfer is a control transfer. This type of transfer is used to configure and initialize a USB device, including its interfaces and endpoints. A control transfer has three Stages, each of which conforms to the token-data-handshake sequence. The three Stages are the Setup Stage, the Data Stage and the Status Stage. The token packet of the Setup Stage is called a Request and specifies a command sent from the host to the device via a special pipe, the Default Pipe. The Request has a well-defined structure that is described below. Any data needed beyond what is contained in the Request or any data returned by the device is sent during the Data Stage. The USB device returns a handshake packet in the Setup Stage with an ACK to accept the Request token sent by the host.

As mentioned above there is a well-defined structure for a Request token. In particular, a Request is 8 bytes long having a request field (1 byte), a request type field (1 byte), a value field 2 bytes), an index field (2 bytes) and a length field (2 bytes).

| Request Packet | | |
| --- | --- | --- |
| Field | Size | Description |
| request_type | 1 byte | Gives the request characteristics |
| request | 1 byte | the actual request |
| value | 2 bytes | data specific to the request |
| index | 2 bytes | information identifying a particular interface or endpoint, if the request is so targeted. |
| length | 2 bytes | length of a possible data stage |

The request_type field (Table B) determines the direction of any data stage associated with the request, the type of Request (Standard, Class, Vendor), and the type of target for the request (Device, Interface, Endpoint, Other). If the target is an interface or endpoint, then the index field is used to specifically identify that target.

| Request_type | |
| --- | --- |
| Bits | Description |
| 7 | Direction of Data Stage (if there is one) |
| 5–6 | Type of request:<br>STANDARD: 0<br>CLASS: 1<br>VENDOR: 2 |
| 0–4 | Type of Target:<br>DEVICE: 0<br>INTERFACE: 1<br>ENDPOINT: 2<br>OTHER: 3 |

The value field is a two byte field that can hold a configuration value and the length field specifies the length of a data stage if the host needs to send more bytes than the value field can hold.

There are 10 standard Request packets (Table C) a host device can send to a USB device. Included in the standard requests are GET_STATUS, GET_DESCRIPTOR, GET_CONFIGURATION, GET_INTERFACE, SET_ADDRESS, SET_CONFIGURATION. These requests are briefly described below.

| Code | Request |
| --- | --- |
| 0 | GET_STATUS |
| 1 | CLEAR_FEATURE |
| 2 | reserved |
| 3 | SET_FEATURE |
| 4 | reserved |
| 5 | SET_ADDRESS |
| 6 | GET_DESCRIPTOR |
| 7 | SET_DESCRIPTOR |
| 8 | GET_CONFIGURATION |
| 9 | SET_CONFIGURATION |
| 10 | GET_INTERFACE |
| 11 | SET_INTERFACE |

The GET_STATUS Request retrieves a two-byte bit map of the status for a device, interface or endpoint in the data stage of the request. The GET_DESCRIPTOR Request retrieves a specified type of standard descriptor from the USB device. There are five types of descriptors, (a) device, (b) configuration, (c) interface, (d) endpoint and (e) string descriptor. The GET_CONFIGURATION Request returns the current configuration value which is expected to be non-zero if the device is configured. The particular configuration is described by a configuration descriptor. The GET_INTERFACE Request returns the alternate setting for a particular interface. The SET_ADDRESS Request enables the host to assign an address to a USB device, which causes the device to enter the Addressed state from the Default state. The Default state is entered after the device is attached to the USB, powered up and reset. The SET_CONFIGURATION Request sends a configuration value to a device. Upon the successful receipt of the Request the device enters the Configured state from the Addressed state. A device can be de-configured by this command, in which case it returns to the Addressed state.

As described above, for a USB Device to function according to the application-specific function which the device provides, the device must be configured. To become configured a USB Device must transition through several states.

When the device is first attached to the USB the device is in the Attached state. From the Attached state the device enters the Powered state when power is applied following which it enters the Default State when reset is applied. In the Reset state the device responds only to address 0h and only the Default Pipe can be used by the host to access the device. The Default Pipe comprises a control endpoint that is bidirectional and this pipe is available before configuration.

The host accesses the device via the Default Pipe to determine its description but must set the address of the device to a non-zero value before configuring the device. When a non-zero address is assigned, the device enters the Addressed state. From this state the host can then configure the device, which means establishing the interfaces and pipes of the device and their characteristics. The descriptors mentioned above are used to set and alter the configuration of a device and the standard descriptors are organized in a defined hierarchy that matches the configuration hierarchy of the device. Thus, there is a device descriptor, which characterizes the device as a whole, at least one configuration descriptor and descriptors for all of the interfaces of that configuration. Finally, there are endpoint descriptors for each interface and there is a string descriptor for storing user-readable information in the device. A USB device must support the high-level protocol of descriptors to become configured and known to the USB host before it can perform the functions of the interfaces that it supports.

Figure 4:
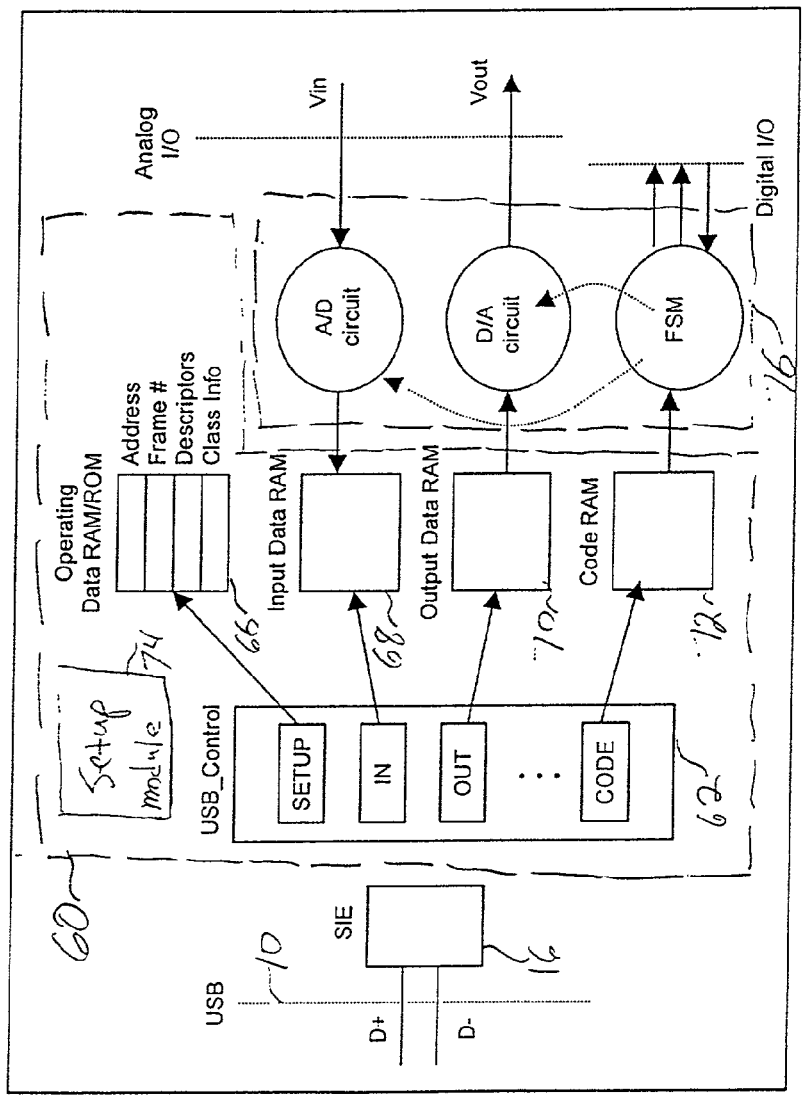
FIG. 4 shows a block diagram of an embodiment of the present invention.

Turning now to FIG. 4, a block diagram of an embodiment of the present invention is shown. Depicted in the block diagram are a serial interface engine (SIE) 16 which connects a USB device to the serial bus and which serializes and de-serializes packets on the bus for the device, and an interfacing device 60 that includes a USB control block 62 with an endpoint register file for the device, one or more dedicated memory blocks 66, 68, 70, 72, and one or more finite state machines including a setup module 74. A memory block 68, 70, 72 and an associated finite state machine (not shown) operate to support the functionality of an endpoint. In the embodiment shown, one memory block 66 associated with the configuration endpoint holds operating data. This memory block 66 preferably includes read-only memory for storing descriptor strings. Alternatively, the descriptor strings are stored in the fixed programming of the setup module 60, which is described in detail below. Another dedicated memory block 72 holds control information for an endpoint that supports interrupt pipe transfers and an associated finite state machine (not shown) interprets the command information sent be means of the interrupt pipe transfers. Additionally, there are dedicated memory blocks for endpoints that support data transfers, one memory block 68 for the IN direction and one block 70 for the OUT direction. A function engine 76 that includes optional A/D and D/A circuitry and a FSM, for controlling the A/D and D/A circuitry, connects to the dedicated command, IN and OUT memories.

The setup module facilitates the configuration of the USB device.

The Setup Module

Figure 5:
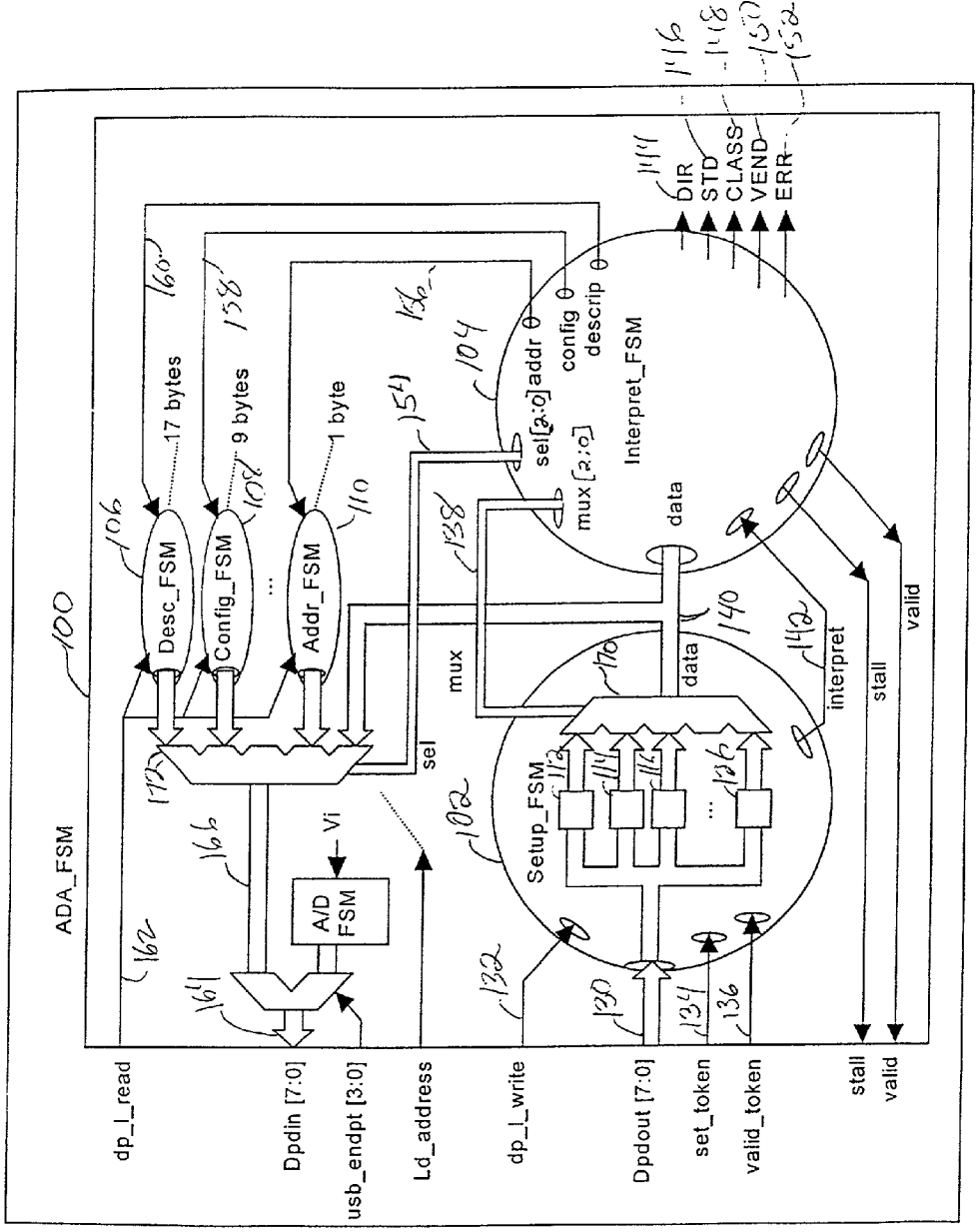
FIG. 5 shows a state machine system for configuring an interfacing device in accordance with the present invention.

A block diagram of the SETUP Module, ADA_FSM 100, is shown in FIG. 5 and a high level hardware language description of the module is set forth in FIGS. 6A–6D. The SETUP Module 100 includes two control state machines, SETUP_FSM 102 and INTERPRET_FSM 104, and one or more data delivering state machines, DESCRIP_FSM 106, CONFIG_FSM 108, ADDR_FSM 110. In one embodiment of the present invention, a data delivering state machine, such as DESCRIP_FSM 106 and CONFIG_FSM 108 is implemented as a single state machine and in another embodiment a data delivery state machine is selected from a plurality of state machines.

The SETUP_FSM 102 of the SETUP Module captures and saves a standard Request carried on the USB and a state machine, INTERPRET_FSM 104, interprets the saved standard Request. One or more data delivery state machines 106, 108, 110 release the information requested in the Request for transmission over the USB to the Host device.

The SETUP_FSM 102 has an interface with the following inputs and outputs as shown in FIGS. 6A and 6B.

| Inputs | Outputs |
|---|---|
| dpdout[7:0] | data[7:0] |
| clk | interpret |
| reset | ACK? |
| mux[2:0] | |
| dp_1_write | |
| set_token | |
| valid_token | |
| usb_endpoint[3:0] | |

Internally, besides control circuitry, the SETUP_FSM has a registers 1112, 114, 116–126 for storing information about a Request. In particular, a register 112 stores the REQ_type, register 114 stores the REQUEST, registers 116–126 store the remaining bytes in the Setup Stage. The registers in the SETUP_FSM are written with data from the dpdout[7:0] bus 130 by a edge of the dp_1_write signal 132. The set_token signal 134 and valid_token signal 136 are used to start the SETUP_FSM 102. The mux[2:0] inputs 138 select one of the registers 112–126 internal to the SETUP_FSM machine 102 to be output on to the data bus, data[7:0] 140.

The INTERPRET_FSM 104 has the following inputs and outputs as shown in FIG. 6C.

| Inputs | Outputs | Outputs |
|---|---|---|
| clk | address | valid |
| reset | config | sel[2:0] |
| data[7:0] | descrip | VEND |
| mux[2:0] | DIR | ERR |
| interpret | STD | stall |
| | CLASS | |

The INTERPRET_FSM 104 receives the Request from the SETUP_FSM 102 over data bus 140 and is started when the SETUP_FSM 102 sets the interpret flag 142. During its operation, the machine, sets the DIR 144, STD 146, CLASS 148, VEND 150, and ERR 152 outputs depending on the content of the Request, and cycles through the binary values of the mux[2:0]138 output to select the registers 112–126 of the SETUP_FSM 102. The INTERPRET_FSM 104 machine also sets the sel[2:0] 154 to select for output one of several data delivery state machines, and enables one of those machines by means of an output, either address 156 for the ADDR_FSM 110, config 158 for the CONFIG_FSM 108, or descrip 160 for the DESC_FSM 106.

The data delivery state machine DESCRIP_FSM 106 has the following inputs and outputs as shown in FIG. 6D.

| Inputs | Outputs |
|---|---|
| clk | desc |
| reset | |
| d_data[7:0] | |
| dp_1_read | |
| descrip | |

The CONFIG_FSM 108 and ADDRESS_FSM 110 have similar inputs and outputs as shown in FIG. 6C. A data delivery state machine, as shown in the figure, receives a flag 156, 158, 160 from the INTERPRET_FSM machine 104 that starts the machine and the dp_1_read signal 162 that clocks the release of the data information from one of the delivery machines to the Dpdin[7:0] bus 164 via an intermediate bus 166, assuming a particular state of the sel[2:0] lines 154.

Operation of the SETUP_FSM

Referring to FIG. 6B, the SETUP_FSM 102 bus data[7:0] connects to the INTERPRET_FSM 104 input bus 140 and the dpdout[7:0] bus is the input bus Dpdout[7:0] 130 to the SETUP_FSM machine. As described above, a Request follows the token-data-handshake model. Therefore, the first packet in a Request is the setup token packet and this packet must be detected by the SETUP Module to get things started. (The setup token packet contains the ADDR and ENDP fields, which identify device and endpoint targeted for communication.) The endpoint in question is captured in the usb_endpt[3:0] register (not shown).

When SETUP_FSM 102 detects the receipt of a token packet and if the valid_token is true, the state machine transitions from its idle state to the get_SETUP state to start reading an eight byte data packet that follows the token packet.

In the get_SETUP state, the first byte, REQ_type, of the data packet is stored on the edge of the dp_1_write signal, dpdout[7] being stored in REQ[7], and dpdout[6:5] being stored in REQ[6:5].

Next, the SETUP_FSM transitions to the get_REQ state to capture the second byte, request on the edge of the dp_1_write signal.

Following this, the SETUP_FSM moves to the get_VALUE1 and get_VALUE2 states to capture the two value bytes, after which it moves to the get INDEX1 and get INDEX2 to capture the index bytes, and finally to the get_LENGTH1 and get_LENGTH2 states to capture the length bytes. These bytes are also captured on the edge of the dp_1_write signal.

At this point, all of the bytes of the data packet of the SETUP stage of a Control Transfer have been captured and the interpret flag, is set to start the INTERPRET_FSM state machine. Also an ACK has been sent to the host to complete the SETUP stage of the Control Transfer.

Operation of INTERPRET_FSM

The INTERPRET_FSM 104 now operates to interpret the Request. The data[7:0] bus receives data from the SETUP_FSM, the mux[2:0] 138 controls the output selector 170 of the SETUP_FSM 102 to select one of the internal registers 112–126 of the SETUP_FSM machine 102. The sel[2:0] 154 bus controls the output selector 172 to select one of the data delivery state machines for output onto the intermediate bus 166.

In state "0", the REQ_type value is assigned to the mux[2:0] register, stall is set to 0 and the machine advances to state got_REQ_type. The mux[2:0] register selects the input multiplexer channel, enabling the data on the data[7:0] input from the SETUP_FSM machine to be received by the INTERPRET_FSM.

In the got_REQ state, the data[7] value is placed in the DIR output to control the direction of the transfer (to the host), and the outputs STD, CLASS, VEND, ERR are set according to the data[6:5] field of the Request byte after which the machine advances to the get_REQ state.

In the sel_REQ state, the sel_REQ is copied into the mux[2:0] register and the machine advances to the got_REQ state in which the Request is parsed to determine what the specific Request is.

The INTERPRET_FSM, in the got_REQ state, considers the possible standard Requests, SET_STATUS, SET_ADDRESS, GET_DESCRIPTOR, GET_CONFIGURATION, and GET_INTERFACE.

If the Request is SET_STATUS, then the status variable is set to a one and the sel[2:0] register is set to the value of 'STATUS'.

If the Request is SET_ADDRESS, then variable address is set to a one and the sel[2:0] register is set to the value of 'ADDRESS'. The sel[2:0] register is used to select an appropriate output state machine, STATUS_FSM, DESCRIP_FSM, CONFIG_FSM or INTERFACE_FSM, into an output port dpdi[7:0]. ADDRESS_FSM generates the sel_ADDR signal to output the address from register in the SIE. If the Request is one of the get commands, then either descrip, do_config, or interface flag is set to a one and the sel[2:0] register is set to either the 'DESCRIP', 'CONFIG', OR 'INTERFACE' values to select the respectively-named state machine, depending on which Request was received. For any other Request, the INTERPRET_FSM sets the stall flag to cause a stall in the handshake phase that follows the data phase of the Data Stage of the Control Transfer.

If the Request was a SET_ADDRESS, then the get_address state of the INTERPRET_FSM is entered, the mux[2:0] register is set to the VALUE2 parameter and if the interpret flag is true, the INTERPRET_FSM machine spins in the get_address state. Otherwise, the INTERPRET_FSM machine goes to the INIT state and spins.

One of several state machines can be started by the INTERPRET_FSM. It is assumed that the DESCRIP_FSM was set to run for the following description.

Operation of the DESCRIP FSM

The function of the DESCRIP_FSM 106 is to deliver a descriptor in the Data Stage of the Control Transfer.

First, in state 0, the DESCRIP_FSM 106 sends out a length byte over the desc[7:0] output port and then proceeds to state 1, In state 1, a type byte is sent over the desc[7:0] port and the machine advances to state 2.

In state 2, a USB version byte is sent, and the machine advances to state 3, in which the machine sends the next byte of the descriptor. The state machine continues to advance through states 4–17 until the last descriptor byte is sent. The result is that a 17 byte descriptor is sent back to the USB host. Each byte that is sent back to the host, is sent on the occurrence of an edge of the dp_1_read signal, which functions as a clock that advances the state machine through its states. The sel[2:0] register from the INTERPRET_FSM has selected the DESCRIP_FSM for output which is also qualified with the usb_endpt[3:0] register, which holds an index value to an endpoint register from which the host is requesting the descriptor. The Setup token contained the endpoint that is the target for communication and this information was captured in the usb_endpt[3:0] register.

As mentioned above, a data delivery state machine is either a single state machine or a state machine selectable from a plurality of state machines, each having data for a specific configuration.

Figure 7:
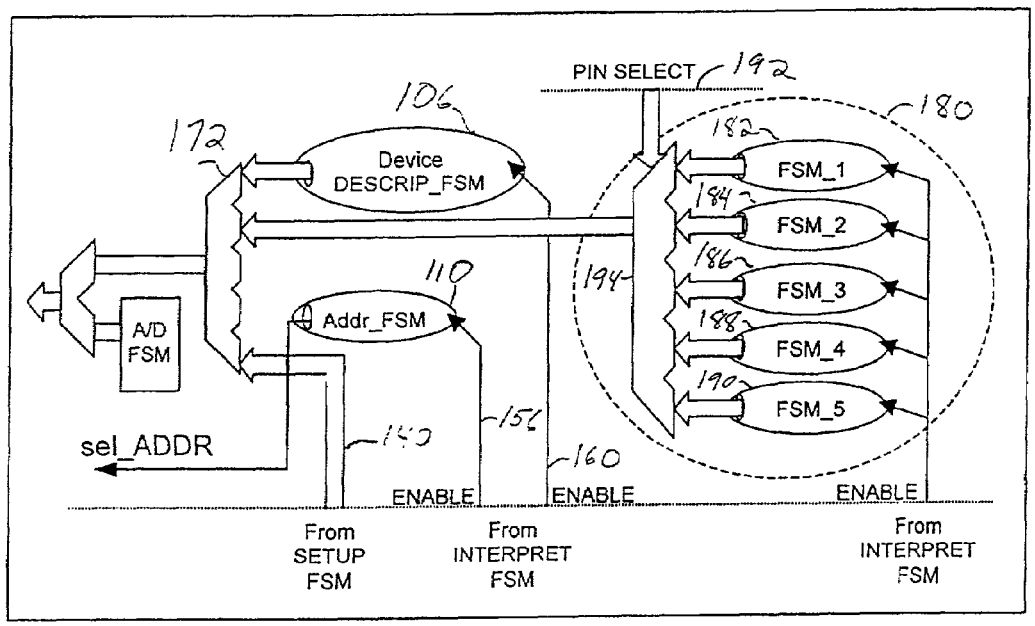
FIG. 7 shows a plurality of selectable state machines for implementing a configuration state machine.

FIG. 7 shows a plurality of selectable state machines 180 for implementing a configuration state machine in accordance with an alternative embodiment of the present invention. Each of the selectable machines 182–190 has a configuration descriptor, one or more interface descriptors for that configuration and one or more endpoint descriptors for each interface. While the length of a device descriptor has a minimum value, the length of a configuration descriptor can be long because the configuration descriptor is a concatenation of all the interface and endpoint descriptors for a configuration. It is preferred in the present invention, to implement a number of selectable configurations in a plurality of finite state machines, each of which has a fixed configuration descriptor, despite the length of the configuration descriptor. This avoids the need for multiple USB device interfaces when different configurations are required. The increase in cost caused by the added silicon area to implement a plurality of configuration state machines is more than offset by the costs of having multiple devices, one per configuration, each handling only a single, fixed descriptor. These costs include mask, NRE, testing, packaging, inventory and advertising. Thus, costs are effectively decreased and functionality is increased by designing multiple descriptors in silicon and allowing the device user to select the configuration.

As an example, a configuration that is suitable for an audio device includes a control endpoint, an interrupt-IN endpoint and two isochronous endpoints, one for IN data and one for OUT data. Another configuration for a mouse or joystick controller device includes a control endpoint and an interrupt-IN endpoint. A third configuration for a floppy disc controller, includes an interrupt endpoint, and bulk-IN and bulk-OUT endpoints. As described above, rather than having three different interfacing devices, all three configurations are implemented as selectable configurations in the same interfacing device. However, only one of the configurations is available for any given application. The host cannot negotiate a configuration with the USB device. Instead, the USB device simply makes available one of its configurations which is thereafter not alterable after the USB device has been configured for the particular application.

FIG. 7 shows one of the selection mechanisms. This selection mechanism includes a set of user-configurable pins 192 for encoding a binary number as a selection code and a data selector 194 to select one of the plurality of configuration state machines 182–190.

Figure 8:
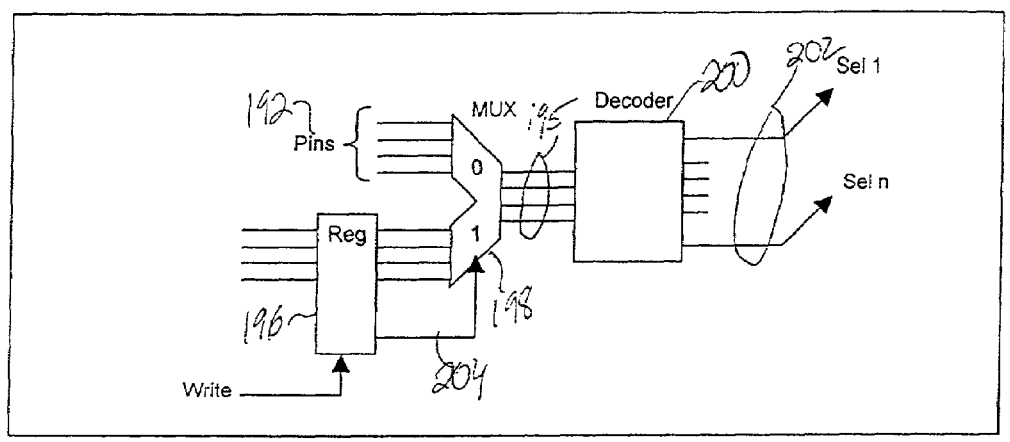
FIG. 8 shows a selection mechanism for selecting one of the plurality of state machines of FIG. 7.

FIG. 8 shows a combined selection mechanism. This selection mechanism includes a writable register 196 that holds a selection code and a decoder 200 whose outputs 202 control data selector or equivalent 194 to select one of the state machines 182–190 of FIG. 7. Multiplexor 198 is not required if the writable register 196 is used instead of the user-configurable pins 192. The combined selection mechanism combines the user-configurable pins and the writable register and includes additional multiplexor 198 for selecting either the selection code from either source. In the combined selection mechanism, an additional bit 204 is used to control selection by the additional multiplexor 198. In the preferred implementation, the extra bit 204 defaults to a value that selects the external pins 192 as the source of the selection code 195. In an implementation that connects a microprocessor such as an 8051 or equivalent to the USB device interface, the preferred location of the writable register 196 is the special function register file of the 8051-type microprocessor.

Figure 9:
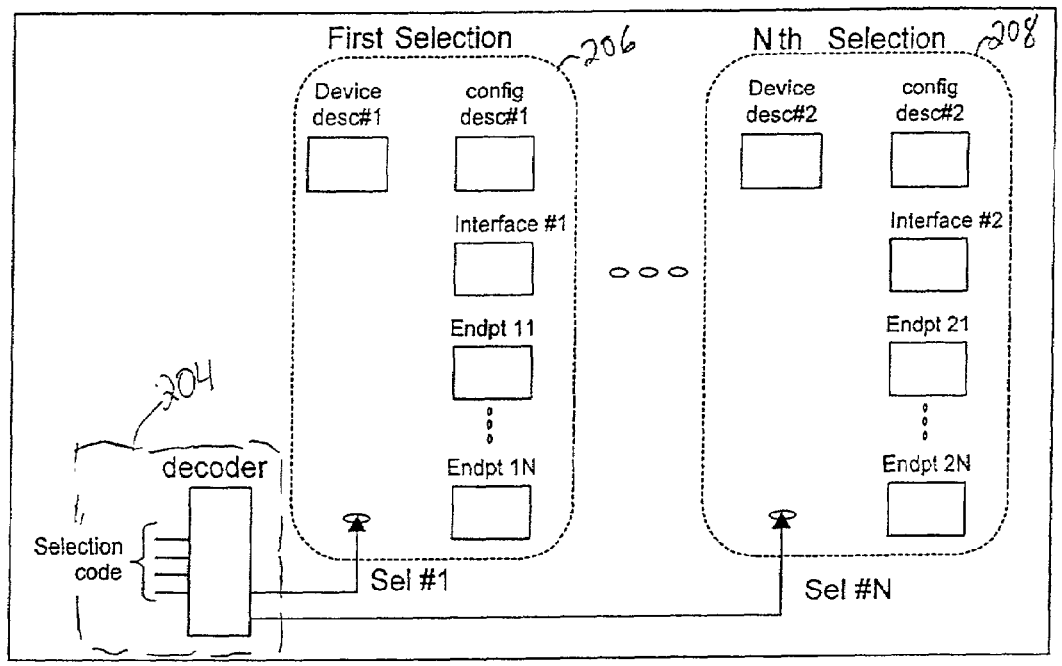
FIG. 9 shows a plurality of selectable configuration state machines and a plurality of descriptor state machines.

As described above, either of the data delivering machines, DESCRIP_FSM 106 in FIG. 5, CONFIG_FSM 108, is implemented, in accordance with the present invention, as a state machine selected from a plurality of selectable state machines. FIG. 9 shows a case in which both the DESCRIP_FSM and the CONFIG_FSM are implemented by a plurality of selectable state machines. Sel #1 selects a first combination 206 of the device descriptor and configuration state machines and Sel #N selects the nth combination 208 of the these state machines. If both the DESCRIP_FSM and CONFIG_FSM state machines are implemented in this fashion, selection of a state machine from each plurality of state machines comes from the same selection source 204, thereby coordinating a compatible selection of device descriptor from the DESCRIP_FSM with a configuration descriptor from the CONFIG_FSM state machine.

Figure 10:
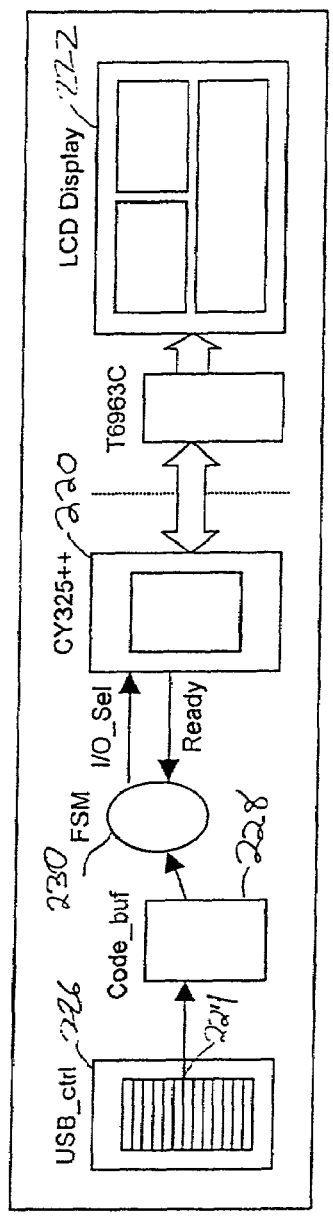
FIG. 10 shows an application of an embodiment of the present invention.

FIG. 10 shows an application of an embodiment of the present invention. In this application the function engine 220 is a CY325++ device that has the functionality required for driving a LCD display 222. In accordance with the present invention, the endpoint register 224 in the USB_ctl block 226 points to a code buffer 228 which receives commands requesting the display of data on the LCD display device 222. A state machine 230 handles the interface between the code buffer 228 and the CY325++ device 220. In this application, only an OUT endpoint and a COMMAND endpoint are required because the display is a write-only peripheral.

Figure 11:
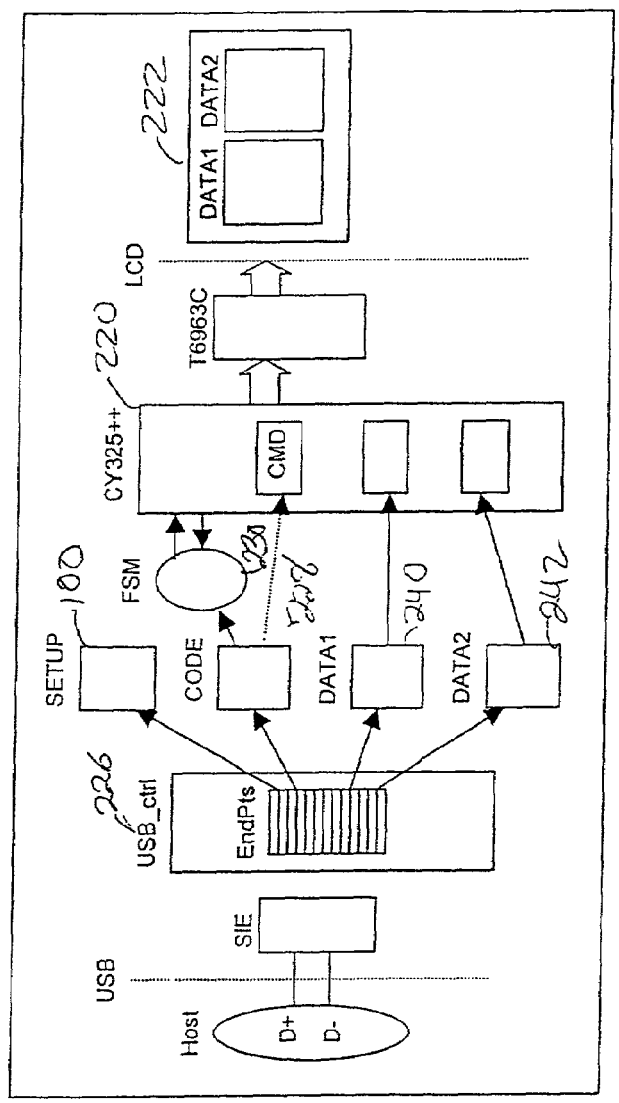
FIG. 11 shows an additional application of an embodiment of the present invention.

FIG. 11 shows an expanded application of an embodiment of the present invention. In this application the function engine is still the CY325++ 220, however there are two LCD windows 222 to be supported by the function engine. For this functionality, a command endpoint (code) 228, and two OUT endpoints (data1 240 and data2 242) are required along with a configuration module (SETUP) 100. The command endpoint receives commands in the code memory and a finite state machine FSM 230 interprets the commands to operate the interface of the CY325++ 220. The data1 240 and data2 242 endpoints receive data for the DATA1 and DATA2 portion of the LCD display 222 respectively. The state machine 230 operates the CY325++ interface so that internal registers of the CY325++ device 220 properly receive the commands and display data.

Although the present invention has been described in considerable detail with reference to certain preferred versions thereof, other versions are possible. Therefore, the spirit and scope of the appended claims should not be limited to the description of the preferred versions contained herein.

What is claimed is:

1. A system for configuring an interfacing device, comprising:
    a plurality of state machines, each for delivering configuration information, including device, configuration, interface and endpoint information, each state machine having a data output and an enable input that activates a state machine to produce its configuration information at the data output, wherein the plurality of state machines includes a plurality of configuration state machines, and a plurality of device descriptor state machines, one device descriptor state machine being associated with at least one of the interface configuration state machines; and
    a selection circuit having a plurality of data inputs, one connected to the data output of each of the state machines, a plurality of selection code inputs that receive selection code signals, and a data output, the selection circuit being configured to connect one of selection circuit data inputs to the data output of the selection circuit in response to signals on the selection code inputs and to select a configuration state machine and a device descriptor state machine that is associated with the selected configuration state machine in response to the selection code signals.

2. A system for configuring an interfacing device comprising:
    a plurality of state machines, each for delivering configuration information, including device, configuration, interface and endpoint information, each state machine having a data output and an enable input that activates a state machine to produce its configuration information at the data output; and
    a selection circuit having a plurality of data inputs, one connected to the data output of each of the state machines, a plurality of selection code inputs that receive selection code signals, and a data output, the selection circuit being configured to connect one of selection circuit data inputs to the data output of the selection circuit in response to signals on the selection code inputs;
    wherein the selection code inputs are provided from a plurality of user-configurable pins.

3. A system for configuring an interfacing device, comprising:
    a plurality of state machines, each for delivering configuration information, including device, configuration, interface and endpoint information, each state machine having a data output and an enable input that activates a state machine to produce its configuration information at the data output;
    a selection circuit having a plurality of data inputs, one connected to the data output of each of the state machines, a plurality of selection code inputs that receive selection code signals, and a data output, the selection circuit being configured to connect one of selection circuit data inputs to the data output of the selection circuit in response to signals on the selection code inputs;

a plurality of user-configurable pins for establishing a first selection code;

a register for holding a second selection code and a multiplexer control signal;

a multiplexer having inputs connected to the user configurable pins and the register and an output, the multiplexer configured to select for output one of the first selection code and second selection code in response to the multiplexer control signal; and a decoder connected to the output of the multiplexer, the decoder generating one or more selection control signals that cause the data output of one of the plurality of state machines to be connected to the data output of the selection circuitry in response to the selected selection code from the multiplexer output.

4. A method for selecting configuration information for a device controller, comprising:

receiving a selection code specifying the configuration information;

selecting, in response to the selection code, configuration information from one of a plurality of state machines configured to deliver the configuration information; and returning the configuration to a host system connected to the device controller over a serial bus;

wherein the selection code is derived from a multiplexer that receives the selection code from one of a set of user-configurable pins connected to the device controller and a programmable register in the device controller, the multiplexer selecting the selection code based on a bit in the programmable register.

* * * * *